United States Patent
Hanes (10) Patent No.: US 9,413,558 B2
(45) Date of Patent: Aug. 9, 2016

(54) COMMUNICATING BETWEEN ELECTRONIC DEVICES USING A PORTABLE STORAGE DEVICE

(75) Inventor: David H Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 168 days.

(21) Appl. No.: 12/872,309

(22) Filed: Aug. 31, 2010

(65) Prior Publication Data

US 2012/0054386 A1   Mar. 1, 2012

(51) Int. Cl.
*G06F 13/42*   (2006.01)
*H04L 12/64*   (2006.01)

(52) U.S. Cl.
CPC ................... *H04L 12/6418* (2013.01)

(58) Field of Classification Search
CPC .................................................. H04L 12/6418
See application file for complete search history.

(56) References Cited

U.S. PATENT DOCUMENTS

| | | | |
|---|---|---|---|
| 7,426,532 B2 | 9/2008 | Bell et al. | |
| 7,865,596 B2 * | 1/2011 | Grosner | G06F 17/30067 709/213 |
| 2004/0255034 A1 * | 12/2004 | Choi | H04L 29/06 709/229 |
| 2006/0047999 A1 * | 3/2006 | Passerini | G06F 11/1458 714/6.12 |
| 2006/0277216 A1 * | 12/2006 | Shukhman | 707/104.1 |
| 2007/0242051 A1 * | 10/2007 | Horikiri et al. | 345/173 |
| 2009/0307603 A1 | 12/2009 | Gowda et al. | |
| 2010/0094847 A1 * | 4/2010 | Malan | H04L 69/18 707/705 |
| 2010/0299518 A1 * | 11/2010 | Viswanathan et al. | 713/152 |
| 2011/0022850 A1 * | 1/2011 | Lee | G06F 21/79 713/189 |
| 2011/0238775 A1 * | 9/2011 | Wu | G06F 17/30233 709/213 |

FOREIGN PATENT DOCUMENTS

| | | |
|---|---|---|
| CN | 201127054 Y | 10/2008 |
| CN | 201175180 Y | 1/2009 |
| CN | 201352827 Y | 11/2009 |
| KR | 20080095046 A | 10/2008 |

OTHER PUBLICATIONS

"Sungale is First to Offer Access to YouTube with ID800WT Digital Photo Frame"; http://www.sungale.com/index.asp?m=news&id=3; Jun. 1, 2009.

* cited by examiner

Primary Examiner — Abdullahi E Salad
(74) Attorney, Agent, or Firm — HP Inc Patent Department (57) ABSTRACT

Embodiments disclosed herein relate to communicating between electronic devices using a portable storage device. In one embodiment, a portable storage device communicates with a first electronic device, and the portable storage device communicates with a second electronic device via a network. The portable storage device sends a request from the first electronic device to the second electronic device. The portable storage device may send a response to the request from the second electronic device to the first electronic device.

20 Claims, 7 Drawing Sheets

COMMUNICATING BETWEEN ELECTRONIC DEVICES USING A PORTABLE STORAGE DEVICE

BACKGROUND

Some electronic devices are used to output media, such as pictures, music, or videos. Multiple types of sources of media content are available. For example, a digital picture frame may retrieve image data from a memory within the digital picture frame and display it. In some cases, electronic devices may retrieve media content from a portable storage device, such as a Universal Serial Bus drive. An electronic device may include network capabilities to retrieve content from remote sources for output.

BRIEF DESCRIPTION OF THE DRAWINGS

In the accompanying drawings, like numerals refer to like components or blocks. The drawings describe example embodiments. The following detailed description references the drawings, wherein.

DETAILED DESCRIPTION

Electronic devices are often used to output media, such as pictures, movies, and music, to a user. An electronic device may retrieve information from a local memory or from a portable storage device, such as a flash drive, to output. In some cases, an electronic device may have networking capabilities for retrieving information from a remote electronic device. For example, a digital display device may include networking capabilities for retrieving image data from a central server. However, including networking capabilities in an electronic device may increase the cost of the electronic device. In addition, the networking capabilities may be included within the electronic device when it is manufactured such that the functionality is not easily added on later by a user.

In one embodiment, a portable storage device provides network connectivity to allow a first electronic device without network capabilities to receive information from, and in some cases store information to, a remote electronic device. For example, the portable storage device may receive a request for information from the first electronic device, retrieve the information from a remote second electronic device, and send the retrieved information back to the first electronic device to respond to the request. Using a portable storage device to provide network connectivity may be cheaper than including networking components in an electronic device when manufactured. In addition, a portable storage device may provide more flexibility because it may be used to provide network connectivity after an electronic device is purchased. A portable storage device may also be used to provide network connectivity on a temporary basis.

The portable storage device may connect to the first electronic device and communicate as a typical storage device with the first electronic device. For example, the portable storage device may use a storage communication protocol, such as a Universal Serial Bus (USB) protocol, for communicating with the first electronic device. In some cases, the first electronic device connected to the portable storage device may be unaware that some retrieved data originates in a remote location rather than in the portable storage device itself.

In some implementations, a remote electronic device retrieves information to send to the electronic device via the portable storage device. The information may be retrieved from the Internet or a home network. The information may include, for example, stocks or weather information or information related to the energy use in a particular building. The retrieved information may then be sent to the portable storage device. The portable storage device may then transmit the retrieved information to the electronic device connected to it that may not have network connectivity. As a result, the electronic device receives real-time data that may otherwise be unavailable using a portable storage device without network connectivity.

In some implementations, data is stored remotely using the portable storage device. For example, the portable storage device may receive information for storage from a first electronic device connected to the portable storage device. The portable storage device may send the information via a network to a remote second electronic device for storage. As a result, more information may be stored than would be available on a portable storage device. In addition, the information may be made available to additional electronic devices via the network connection.

Figure 1:
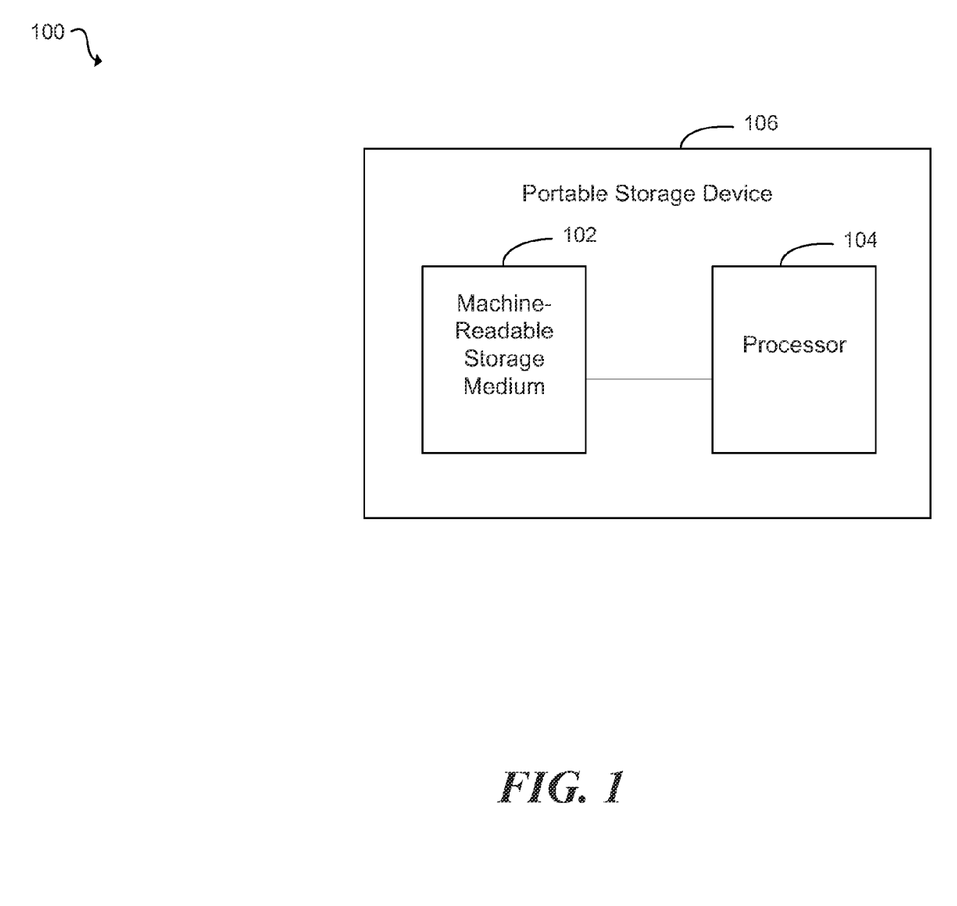
FIG. 1 is a block diagram illustrating one example of a computing system.

FIG. 1 is a block diagram illustrating one embodiment of a computing system 100. The computing system 100 may include, for example, a portable storage device 106. The portable storage device 106 may be portable such that it may be attached or removed from an electronic device. The portable storage device 106 may communicate using any suitable format, such as a Universal Serial Bus (USB), x-D picture card, or a CompactFlash (CF) format. The portable storage device 106 may receive information for storage and send requested stored information. In one implementation, the portable storage device 106 communicates via a network. The portable storage device 106 may include a machine-readable storage medium 102 and a processor 104.

The processor 104 may be any suitable processor. For example, the processor 104 may be one or more processing units, semiconductor-based microprocessors, and/or other devices suitable for retrieval and execution of instructions stored in the machine-readable storage medium 102. The processor 104 may fetch, decode, and execute instructions stored in the machine-readable storage medium 102 to implement the functionality described in detail below. As an alternative or in addition to fetching, decoding, and executing instructions, the processor 104 may include one or more integrated circuits (ICs) or other electronic circuits that comprise a plurality of electronic components for performing the functionality described below.

The machine-readable storage medium 102 may be any electronic, magnetic, optical, or other physical storage that stores executable instructions or other data (e.g., flash memory, etc.). The machine-readable storage medium 102 may include instructions executable by the processor 104, for example, instructions to access a request for information from a first electronic device, where the request is based on a storage communication format, instructions to transmit via a network the request to a second electronic device, instructions to access via the network a response from the second electronic device, and instructions to send the response to the first electronic device using the storage communication format.

Figure 2:
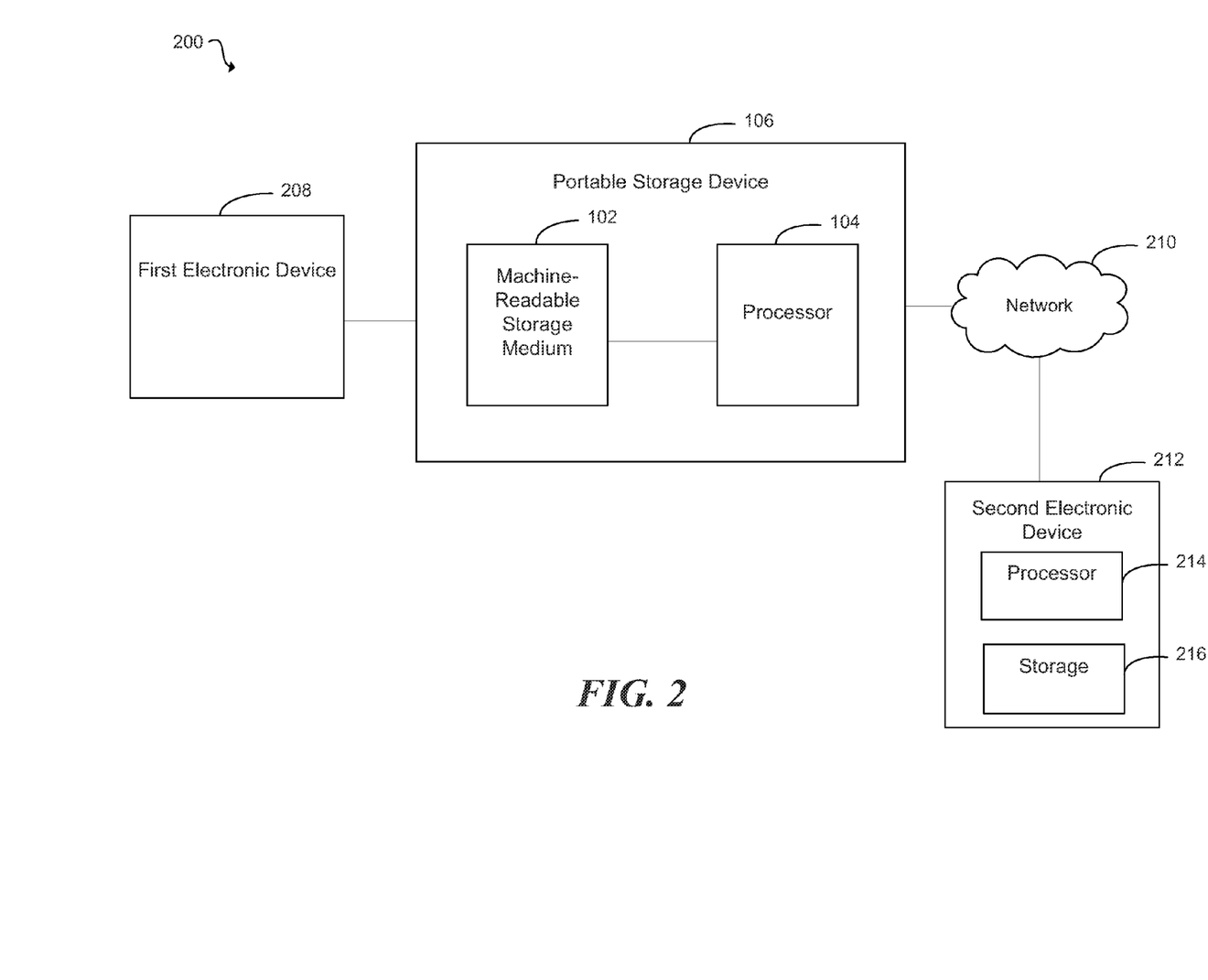
FIG. 2 is a block diagram illustrating one example of a computing system.

FIG. 2 is a block diagram illustrating one embodiment of a computing system 200. The computing system 200 includes the portable storage device 106 from FIG. 1. The computing system 200 also includes a first electronic device 208 connected to the portable storage device 106 and a second electronic device 212 communicating with the portable storage device 106 via the network 210. The portable storage device 106 may appear as a typical portable storage device to the first electronic device 208. However, the portable storage device 106 may respond to requests for stored information by retrieving information from the second electronic device 212 and sending it to the first electronic device 208. In some implementations, the portable storage device 106 also stores information received from the first electronic device 208 in the second electronic device 212.

The first electronic device 208 may be any suitable electronic device. For example, the first electronic device 208 may be a digital display device, such as a digital picture frame, an audio device, such as an mp3 player, a media player, such as a Blu-ray® media player, or a television. The portable storage device 106 may be attached to or removed from the first electronic device 208. For example, the portable storage device 106 may be a Universal Serial Bus (USB) drive that plugs into the first electronic device 208.

The portable storage device 106 and the second electronic device 212 may communicate via the network 210. The network 210 may be any suitable network, such as the Internet or a wired or wireless local area network. The portable storage device 106 and the second electronic device 212 may communicate using, for example, wireless, Bluetooth®, or Zig-Bee.

The second electronic device 212 may be any suitable electronic device, such as a server, mobile phone, or personal computer. The second electronic device 212 may be a low power computer, such as a plug computer. The second electronic device 212 may include a processor, such as the processor 214, for retrieving and formatting data. For example, the processor 214 may retrieve stock information from the Internet and format image data from it that may be displayed on the first electronic device 208. The second electronic device 212 may include a storage 216 for storing data. The storage 216 may be any suitable storage, such as a hard disk drive or flash memory. The storage 216 may be mapped to the portable storage device 106 such that data stored to or retrieved from the portable storage device 106 is actually stored to or retrieved from the storage 216 associated with the second electronic device 212.

In some implementations, the portable storage device 106 communicates with multiple electronic devices via a network to receive and send data for the first electronic device 208. In some implementations, the second electronic device 212 communicates with multiple portable storage devices. For example, the second electronic device 212 may send the same information to multiple portable storage devices for display on corresponding electronic devices.

Figure 3:
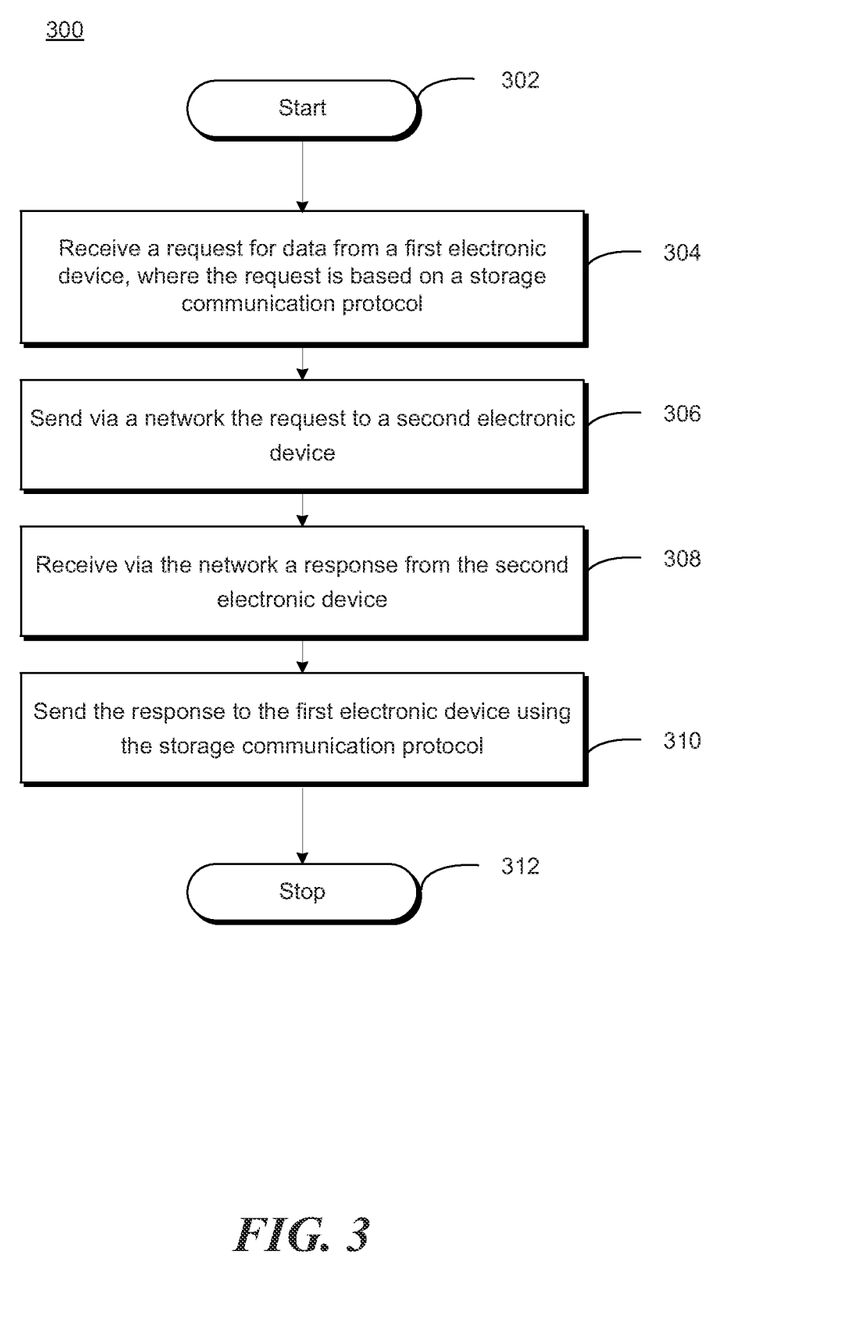
FIG. 3 is a flow chart illustrating one example of a method for communicating between electronic devices using a portable storage device.

FIG. 3 is a flow chart illustrating one example of a method 300 for communicating between electronic devices using a portable storage device. For example, the first electronic device 208 may request data from the portable storage device 106. The portable storage device 106 may respond by retrieving data from the second electronic device 212 and sending the retrieved data to the first electronic device 208. The second electronic device 212 may retrieve information from various sources, such as from monitoring software or the Internet, and send the retrieved information to the first electronic device 208 via the portable storage device 106. The first electronic device 208 may be able to access data stored remotely even if the first electronic device 208 does not include networking capabilities.

Beginning at block 302 and moving to block 304, the processor 104, such as by executing instructions in the machine-readable storage medium 102, receives a request for data from the first electronic device 208, where the request is based on a storage communication protocol. The request may be accessed in any suitable manner. For example, the portable storage device 106 may attach to the first electronic device 208 and receive the request via a communication mechanism, such as a physical interface between the portable storage device 106 and the first electronic device 208.

The storage communication protocol may be any suitable storage communication protocol. For example, the request may be received in a Universal Serial Bus (USB), Compact-Flash (CF), or x-D picture card format. The portable storage device 106 may receive any suitable request for data from the first electronic device 208, such as a request for data stored at a particular location in the portable storage device 106. For example, the portable storage device 106 may receive a read command block associated with the storage communication protocol indicating that the first electronic device 208 would like to read data stored in a particular location of the portable storage device 106. The particular location of the portable storage device 106 may be mapped to a storage location in the second electronic device 212. For example, location X in the portable storage device 106 may correspond to location Y in the storage 216 associated with the second electronic device 212. In some implementations, the first electronic device 208 may send a request for information, such as a read command, in the same manner to the portable storage device 106 as to a portable storage device without network connectivity. For example, the first electronic device 208 may be unaware data is not being read from and written to the portable storage device 106 itself.

Moving to block 306, the processor 104, such as by executing instructions in the machine-readable storage medium 102, sends via a network, such as the network 210, the request to the second electronic device 212. The processor 104 may transmit the information in any suitable manner. For example, the processor 104 may send the information directly to the second electronic device 212 via the network 210 or to a database associated with the second electronic device 212. The information related to the request may be any suitable information. In one implementation, the processor 104 transmits the read block received from the first electronic device 208 to the second electronic device 212.

The processor 104 may perform some processing on the request or include additional information before sending it to the second electronic device 212. For example, the portable storage device 106 may store mapping information about the relationship between a virtual location on the portable storage device 106 and the corresponding location in a storage, such as a database or file, associated with the second electronic device 212. In one implementation, the portable storage device 106 receives a command descriptor block, such as a Universal Serial Bus (USB) command descriptor block, including a logical address field associated with a location in the portable storage device 106. The portable storage device 106 may look up the portable storage device 106 location in a mapping to determine the associated location in the second electronic device 212 storage 216. The portable storage device 106 may replace the logical address field with storage information, such as a file offset, associated with information stored in the second electronic device 212. The portable storage device 106 may send the updated command descriptor block to the second electronic device 212, such as using a server message block (SMB) or common internet file system (CIFS) protocol.

In one implementation, the second electronic device 212 stores a mapping between virtual locations on the portable storage device 106 and storage locations in the storage 216 of the second electronic device 212. The portable storage device 106 may send the second electronic device 212 information about the virtual portable storage device 106 location received from the first electronic device 208, and the second electronic device 212 may determine the associated location in the storage 216 based on the mapping.

Continuing to block 308, the processor 104, such as by executing instructions in the machine-readable storage medium 102, receives via the network 210 a response from the second electronic device 212. The response may be accessed in any suitable manner, such as via the network 210. The response may be any suitable response. The response may include information stored in the storage 216 associated with a location the portable storage device 106, such as information previously stored by the first electronic device 208.

In some implementations, the second electronic device 212 may retrieve information from a third electronic device to send to the portable storage device 106. In some cases, the second electronic device 212 may retrieve information and store it in the storage 216 to later send the information to the portable storage device 106 in response to a request. For example, the second electronic device 212 may gather monitoring information from a home network, such as information about energy use or temperature. The second electronic device 212 may gather information from the Internet, such as information about the weather, news, or stock quotes. In some implementations, a trigger alerts the second electronic device 212 to gather data. The trigger may be a communication or an event, such as the ringing of a door bell in a home. In some cases, the information may be retrieved in response to the request from the portable storage device 106

In some implementations, the second electronic device 212 formats retrieved information so that it is compatible with the first electronic device 208. For example, the electronic device may format the information into a format that may be output by the first electronic device 208, such as formatting the information into an image file or audio file.

Proceeding to block 310, the processor 104, such as by executing instructions in the machine-readable storage medium 102, sends the response to the first electronic device 208 using the storage communication protocol. The processor 104 may send any suitable data related to the response. The processor 104 may send the response received from the second electronic device 212 or may process the data response prior to sending the information to the first electronic device 208. The processor 104 may send the data in any suitable manner, such as using a command descriptor block associated with the protocol. In some implementations, the first electronic device 208 then outputs the received data. The method continues to block 312 and ends.

Figure 4:
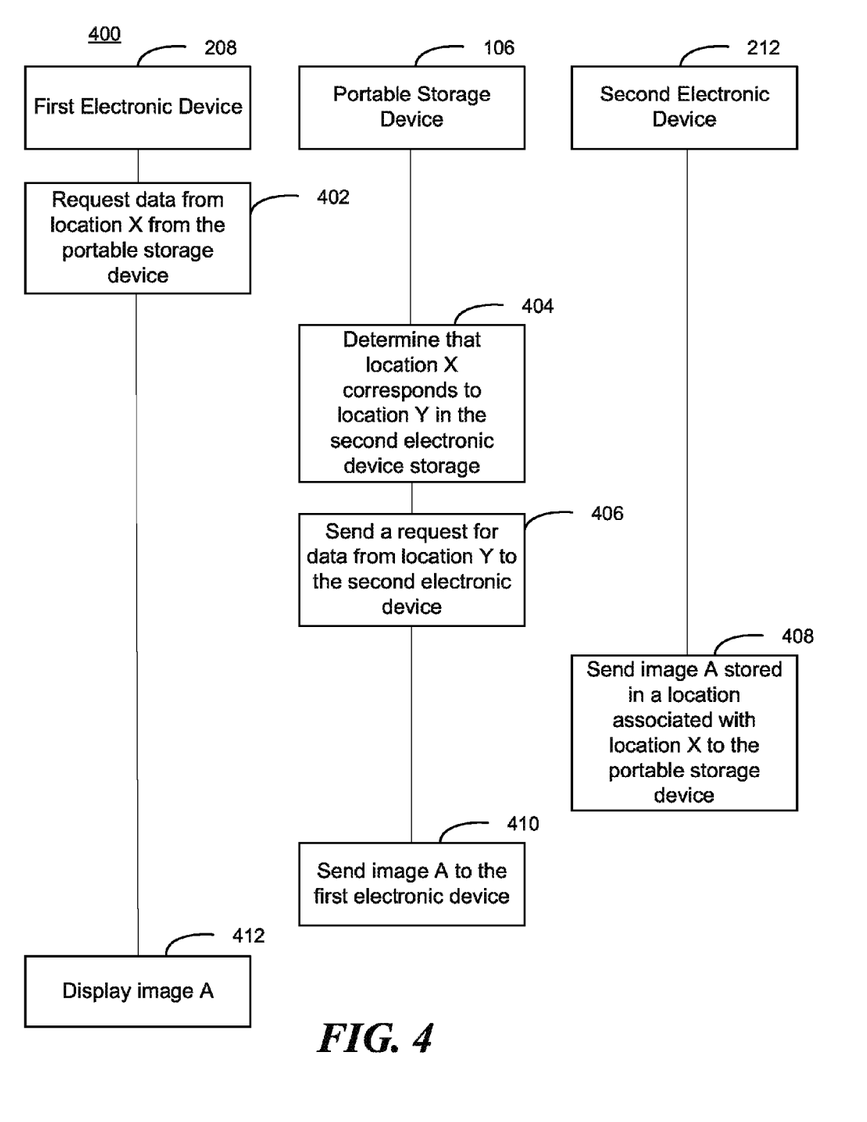
FIG. 4 is a block diagram illustrating one example of communicating between electronic devices using a portable storage device.

FIG. 4 is a block diagram illustrating one example 400 of communicating between electronic devices using a portable storage device. The example 400 shows the activities of the first electronic device 208, the portable storage device 106, and the second electronic device 212. Beginning at block 402, the first electronic device 208 requests the data stored in location X of the portable storage device 106. The first electronic device 208 may not be aware that location X is mapped to a location in the second storage device 212. Moving to block 404, the portable storage device 106 determines that location X is mapped to location Y in the second electronic device 212. Continuing to block 406, the portable storage device 106 sends information about the data request for location Y to the second electronic device 212. Proceeding to block 408, the second electronic device 212 sends image A stored in a location associated with location Y to the portable storage device 106. Continuing to block 410, the portable storage device 106 sends the received image A to the first electronic device 208. Moving to block 412, the first electronic device 208 displays the received image A.

Figure 5:
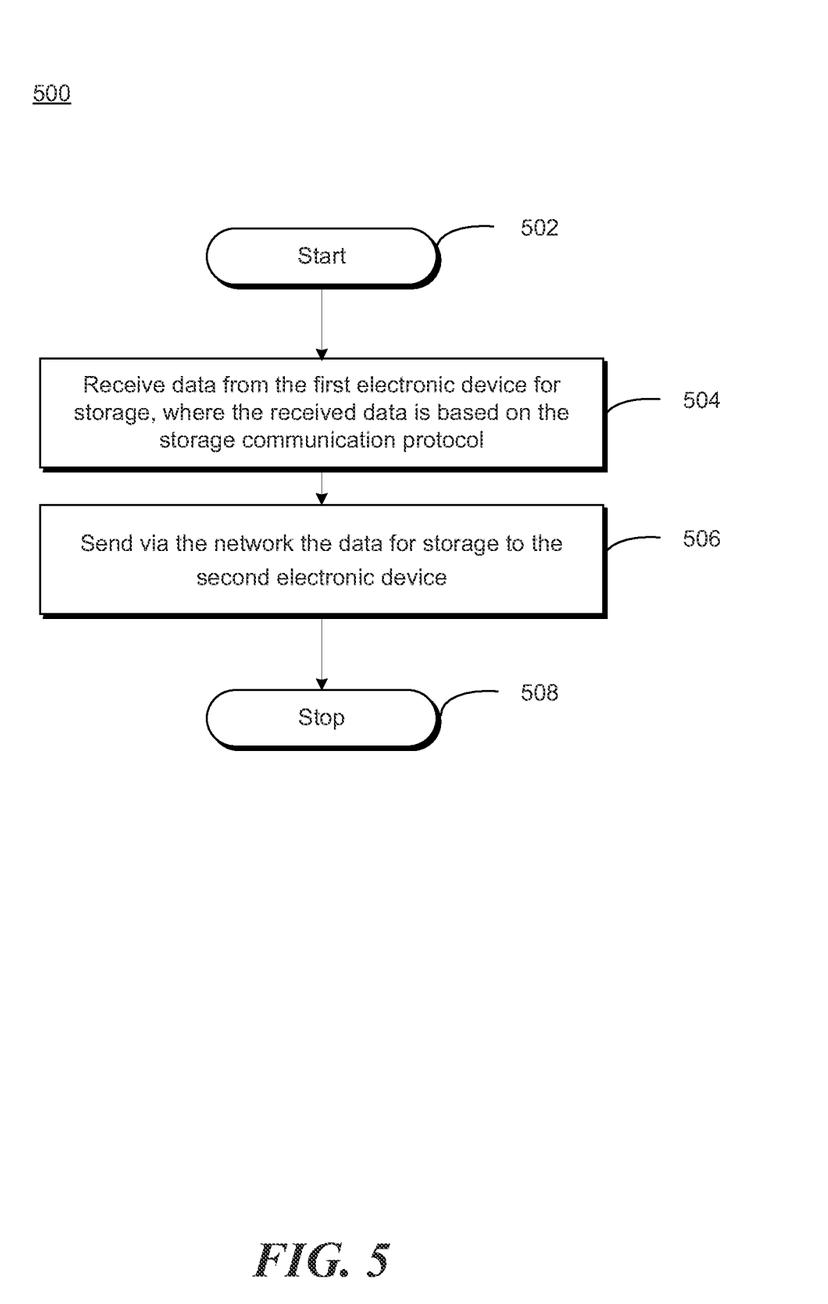
FIG. 5 is a flow chart illustrating one example of a method for storing data using a portable storage device.

FIG. 5 is a flow chart illustrating one example of a method 500 for storing data using a portable storage device. For example, the first electronic device 208 may send information to the portable storage device 106 for storage. The portable storage device 106 may send the information via the network 210 for storage in the second electronic device 212. The information would then be available for retrieval from the second electronic device 212 if requested by the portable storage device 106. In some cases, the second electronic device 212 may send the stored information to other electronic devices.

Beginning at block 502 and moving to block 504, the processor 104, such as by executing instructions in the machine-readable storage medium 102, receives data from the first electronic device 208 for storage, where the received data is based on the storage communication protocol. The data may be received in any suitable manner. For example, the first electronic device 208 may send data to the portable storage device 106 for storage via a physical communication mechanism. The data may be any suitable data, such as audio, video, or image data. The data may be data to be stored for later retrieval by the first electronic device 208 or stored for use by another electronic device.

Moving to block 506, the processor 104, such as by executing instructions in the machine-readable storage medium 102, sends via the network 210 the data for storage to the second electronic device 212. The processor 104 may send the information in any suitable manner. For example, the processor 104 may send the information via the network 210 to the second electronic device 212 or to a database associated with the second electronic device 212. In one implementation, the first electronic device 208 receives a status message from the network 210 acknowledging that the data for storage was received by the second electronic device 212. The status message may, for example, serve as a confirmation to the first electronic device 208 that the second electronic device 212 received the data.

In one implementation, the processor 104 receives from the first electronic device 208 about a location for storing the data. The processor 104 may send information about the location to the second electronic device 212. For example, the second electronic device 212 may determine where to store the data based on the virtual portable storage device 106 location. In one implementation, the processor 104 determines a location in storage 216 mapped to the received location, and the processor 104 sends information about the storage 216 location to the second electronic device 212. The second electronic device 212 may then store the data in the appropriate location in the storage 216. The method continues to block 508 and ends.

Figure 6:
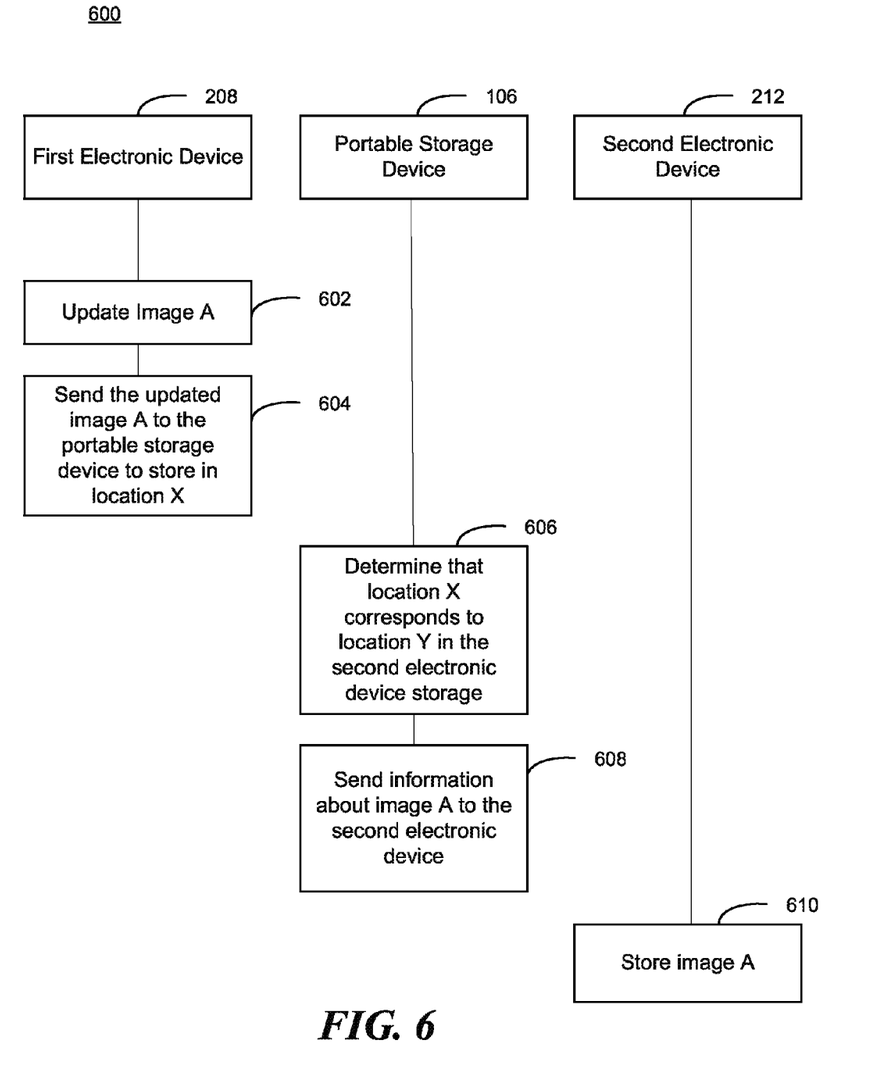
FIG. 6 is a block diagram illustrating one example of storing data using a portable storage device.

FIG. 6 is a block diagram illustrating one example 600 of storing data using a portable storage device. The example 600 shows the activities performed by the first electronic device 208, the portable storage device 106, and the second electronic device 212. Beginning at block 602, the first electronic device 208 updates image A, such as after receiving input to crop image A. Moving to block 604, the first electronic device 208 sends the updated image A to the portable storage device 106 to store in location X. Continuing to block 606, the portable storage device 106 determines, such as by checking a mapping table, that location X corresponds to location Y in the storage 216 of the second electronic device 212. Moving to block 608, the portable storage device 106 sends information about image A and location Y to the second electronic device 212. Proceeding to block 610, the second electronic device 212 stores image A. Image A may be available for retrieval by the first electronic device 208 via the portable storage device 106 such that the first electronic device 208 is not aware that image A is not stored in the portable storage device 106.

Figure 7:
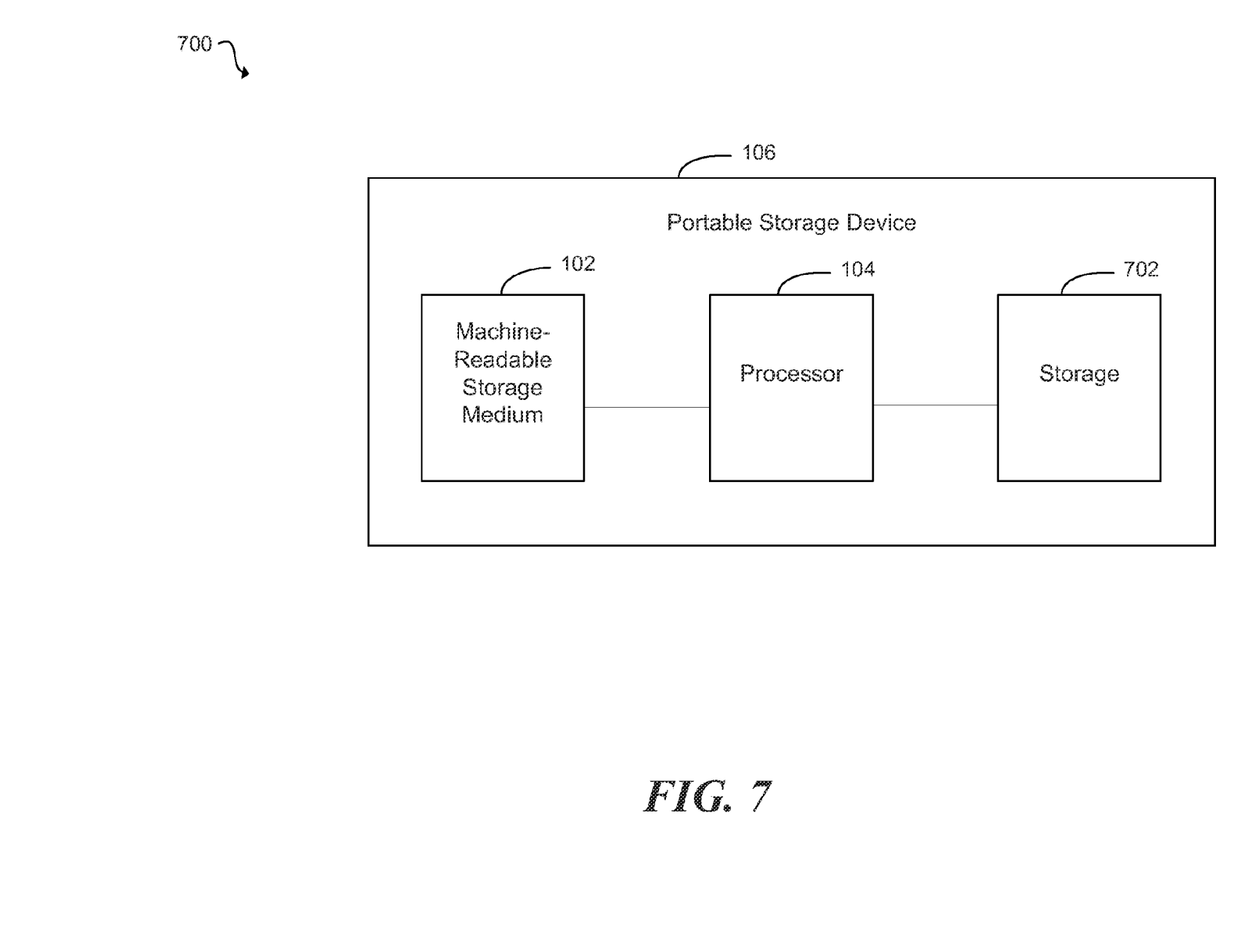
FIG. 7 is a block diagram illustrating one example of a computing system.

FIG. 7 is a block diagram illustrating one example of a computing system 700. The block diagram 700 shows the portable storage device 106. The portable storage device 106 may include a storage 702. The storage 702 may be any suitable storage. In one implementation, the portable storage device 106 caches data received from the second electronic device 212. For example, the portable storage device 106 may receive information from the second electronic device 212 and store it in the storage 702. When the first electronic device 208 requests information, the portable storage device 106 may send the information from the second electronic device 212 stored in the storage 702. Storing the data locally may allow it to be sent more quickly and sent when a network connection is unavailable.

The storage 702 may also be used to store information sent from the first electronic device 208. For example, the portable storage device 106 may temporarily store data received from the first electronic device 208 in the storage 702 and later send the data stored in the storage 702 to the second electronic device 212. For example, the portable storage device 106 may send multiple pieces of data at once or may store data and send it when a network connection is available.

Using a portable storage device to communicate with an electronic device allows the electronic device to receive information via a network even if the electronic device does not have network connectivity capabilities. Such a system may be cheaper and more flexible than including networking capabilities in the electronic device.

The invention claimed is:

1. A portable storage device comprising:
a processor; and
a communication mechanism, when executed by the processor, to cause the processor to:
receive a read command from a first electronic device using a storage communication protocol;
send via a network the read command to a second electronic device;
receive via the network a response to the read command from the second electronic device; and
send the response to the first electronic device using the storage communication protocol;
wherein the communication mechanism further causes the processor to replace a logical field address in a command descriptor block of the read command with a corresponding storage location information associated with the second electronic device and transmit an updated command descriptor block with the read command to the second electronic device.

2. The portable storage device of claim 1, wherein the communication mechanism further causes the processor to:
receive a request from the first electronic device for data storage, wherein the received request is based on the storage communication protocol; and
send, via the network, the request to the second electronic device.

3. The portable storage device of claim 1, wherein the communication mechanism further causes the processor to establish a network connection, based on the request, using the storage communication protocol.

4. The portable storage device of claim 1, wherein the portable storage device further comprises a storage,
wherein the processor further stores the response to the read command received from the second electronic device in the storage, and
wherein sending the response to the first electronic device comprises sending the response, based on the storage communication protocol, from the storage to the first electronic device.

5. The portable storage device of claim 1, further comprising a Universal Serial Bus connector for connecting the portable storage device with the first electronic device, wherein the storage communication protocol comprises a Universal Serial Bus protocol.

6. The portable storage device of claim 1, wherein:
the read command indicates a particular location of the portable storage device from which data is to be read; and
the portable storage device further comprises a map mapping that particular location to the corresponding storage location in the second electronic device.

7. The portable storage device of claim 6, wherein the particular location comprises a logical address field in a Universal Serial Bus command descriptor block.

8. The portable storage device of claim 7, wherein the communication mechanism transmits the updated command descriptor block to the second electronic device using one of: a server message block (SMB) protocol and a common internet file system (CIFS) protocol.

9. A method for communicating between electronic devices using a portable storage device, comprising:
receiving, by a processor associated with a portable storage device, a request based on a storage communication protocol;
sending, by the processor, via a network, the request to a second electronic device;
receiving, by the processor, via a network, a response to the request from the second electronic device; and
sending, by the processor, the response to the first electronic device using the storage communication protocol;
wherein sending the request to the second electronic device comprises, by the processor replacing a logical field address in a command descriptor block of the request with a corresponding storage location information associated with the second electronic device and transmitting an updated command descriptor block with the request to the second electronic device.

10. The method of claim 9, wherein the request comprises one of: a read command and a request for data storage.

11. The method of claim 9, further comprising:
establishing a network connection, based on the request;
receiving, by the processor, data from the first electronic device for communication, wherein the received data is using the storage communication protocol; and sending, by the processor, via the network connection, the data to the second electronic device for storage.

12. The method of claim 9, wherein the first electronic device comprises a digital display device.

13. The method of claim 9, wherein receiving the response to the request from the second electronic device comprises receiving the response from the second electronic device, the response having been received by the second electronic device from a third electronic device.

14. The method of claim 9, wherein the storage communication protocol comprises a Universal Serial Bus protocol.

15. A machine-readable non-transitory storage medium encoded with instructions executable by a processor associated with a portable storage device for communicating between electronic devices using the portable storage device, the machine-readable medium comprising instructions to:
   access a request from a first electronic device, wherein the request is based on a storage communication format;
   transmit via a network the request to a second electronic device;
   access via the network a response to the request from the second electronic device; and
   send the response to the request to the first electronic device using the storage communication format;
   wherein the instructions to transmit the request to the second electronic device further comprise instructions to replace a logical field address in a command descriptor block of the request with a corresponding storage location information associated with the second electronic device and transmit an updated command descriptor block with the request to the second electronic device.

16. The machine-readable non-transitory storage medium of claim 15, further comprising instructions to:
   receive information for storage from the first electronic device, wherein the information is associated with the storage communication format; and
   transmit via the network connection the information to the second electronic device for storage.

17. The machine-readable non-transitory storage medium of claim 15, wherein the first electronic device comprises a digital display device.

18. The machine-readable non-transitory storage medium of claim 15, wherein the request comprises a read command.

19. The machine-readable non-transitory storage medium of claim 18, wherein:
   the read command indicates a particular location of the portable storage device from which data is to be read; and
   the instructions further comprise a map mapping that particular location to a storage location in the second electronic device.

20. The machine-readable non-transitory storage medium of claim 15, wherein the storage communication format comprises a Universal Serial Bus format.

* * * * *